Jan. 15, 1935. F. H. BANBURY 1,987,659

MIXER FOR PLASTICS

Filed May 12, 1933 3 Sheets-Sheet 1

INVENTOR
Fernley H. Banbury,
BY
Fraser, Myers & Manley
ATTORNEYS.

Jan. 15, 1935.  F. H. BANBURY  1,987,659
MIXER FOR PLASTICS
Filed May 12, 1933  3 Sheets-Sheet 2
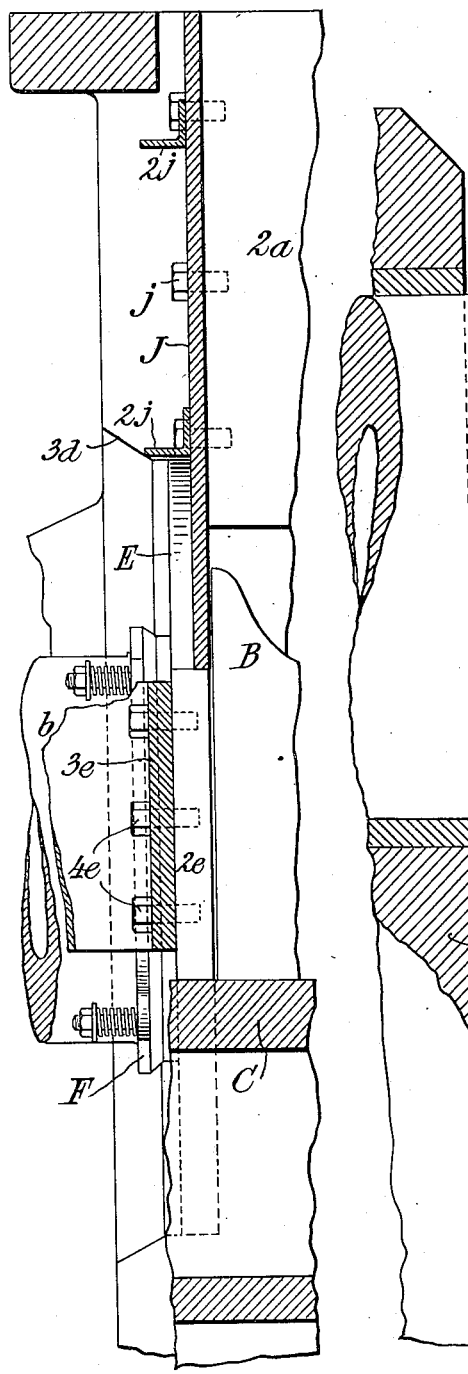
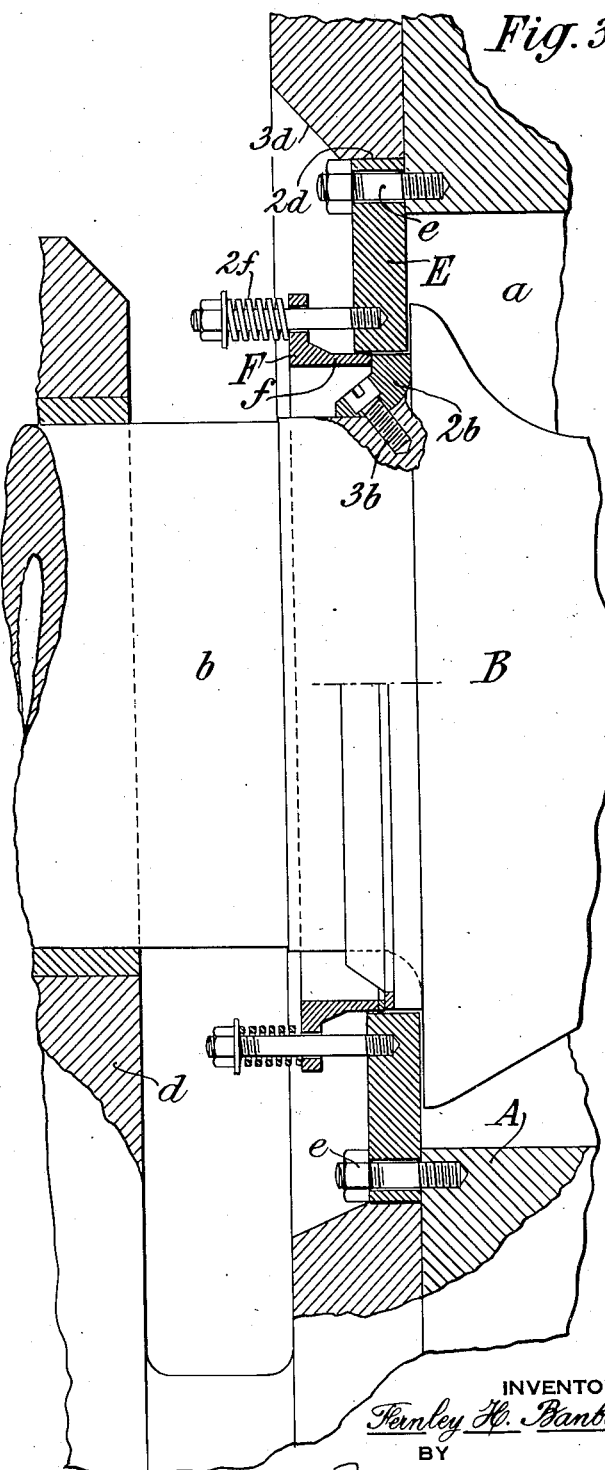
INVENTOR
Fernley H. Banbury
BY
Fraser, Myers & Manley
ATTORNEYS Jan. 15, 1935.　　　F. H. BANBURY　　　1,987,659
MIXER FOR PLASTICS
Filed May 12, 1933　　3 Sheets-Sheet 3

INVENTOR
Fernley H. Banbury,
BY
Fraser, Myers & Manley
ATTORNEYS.

Patented Jan. 15, 1935

1,987,659

UNITED STATES PATENT OFFICE 1,987,659

MIXER FOR PLASTICS

Fernley H. Banbury, Ansonia, Conn.

Application May 12, 1933, Serial No. 670,653

9 Claims. (Cl. 18—2)

My present invention relates to mixers for plastics and devices of analogous character, and aims to provide certain improvements therein. More particularly it has especial application to the well known Banbury mixer which is designed primarily for mixing or kneading raw rubber with compounding ingredients for providing rubber mixes for various commercial purposes and also for mixing or compounding other plastics having high viscosities. Types of Banbury mixers to which my present invention is applicable are illustrated and described in my prior Patents Nos. 1,279,220, September 19, 1918, and 1,818,449, August 11, 1931, which show rubber mixers comprising a casing consisting essentially of three parts, namely, a side member having a single or twin, substantially cylindrical troughs within which rotors having blades or wings for kneading the rubber are rotatable, and a pair of end walls which close the ends of the troughs. These end walls are usually integrally formed with spaced bearings which support the shafts of the rotors.

In devices of the character described, the vertical inner faces of the end walls which constitute the ends of the mixing troughs are subject to some abrasion due to the rubber stock or other material being treated rubbing thereover, and also in part to the ends of the wings of the rotor which at times rub thereagainst. Heretofore when such abrasion or wear had become pronounced, the machine had to be dismantled so that the end walls might be re-dressed or otherwise treated to take up this wear.

According to my present invention I greatly simplify and facilitate the compensating for such wear by the provision of means which render the dismantling of the machine unnecessary. This I accomplish by forming the end walls with large openings which overlie the trough ends of the side member and mounting over said trough ends detachable or separable rings or so-called rotor end plates which can be removed independently of the end walls. A further feature of novelty of my present invention resides in the provision of detachable or separable plates for enclosing the lower part of the neck of the mixer whereby access can be gained to the interior of the neck portion of the mixer for releasing the floating weight normally disposed therein or for making close inspection of the rotors without resorting to dismantling the machine.

The invention also includes other features of improvements which will be understood from the detailed description which follows, when considered in conjunction with the accompanying drawings, wherein I have illustrated certain embodiments of my invention and wherein:

Fig. 3 is an enlarged section taken substantially along the plane of the line 3—3 of Fig. 1.

Fig. 4 is an enlarged section taken substantially along the plane of the line 4—4 of Fig. 1.

Figure 1:
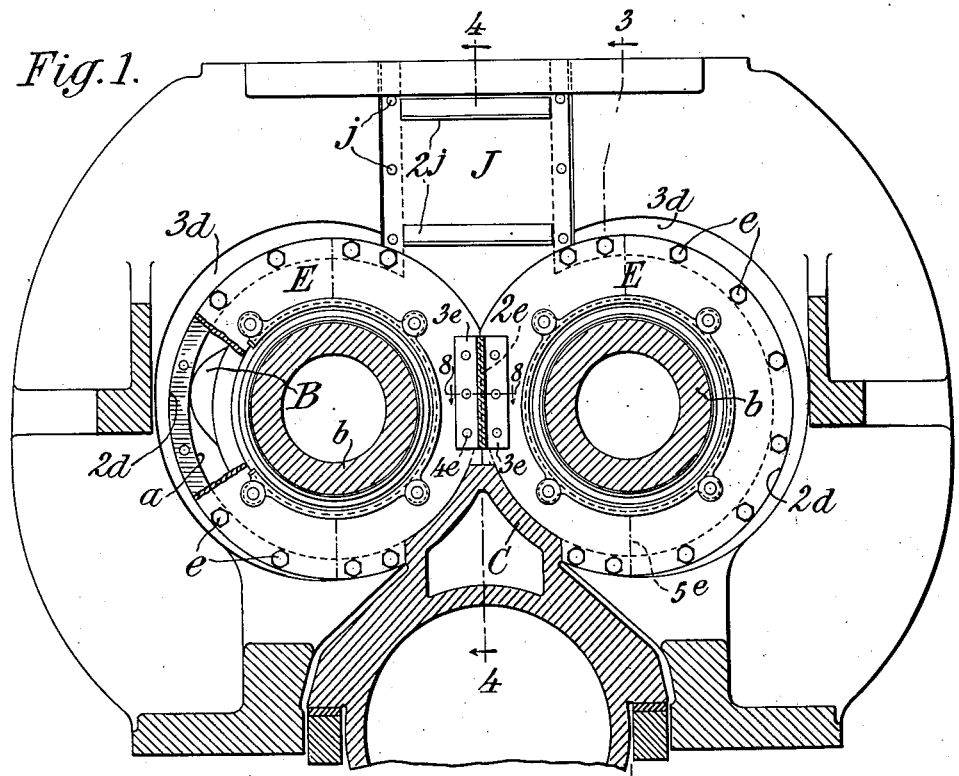
Figure 1 is an end view of a Banbury mixer taken substantially along the plane of the line 1—1 of Fig. 2.
Figure 8:
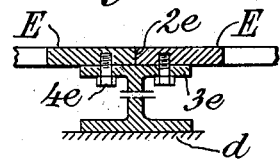
Fig. 8 is a section taken substantially along the plane of the line 8—8 of Fig. 1.
Figure 2:
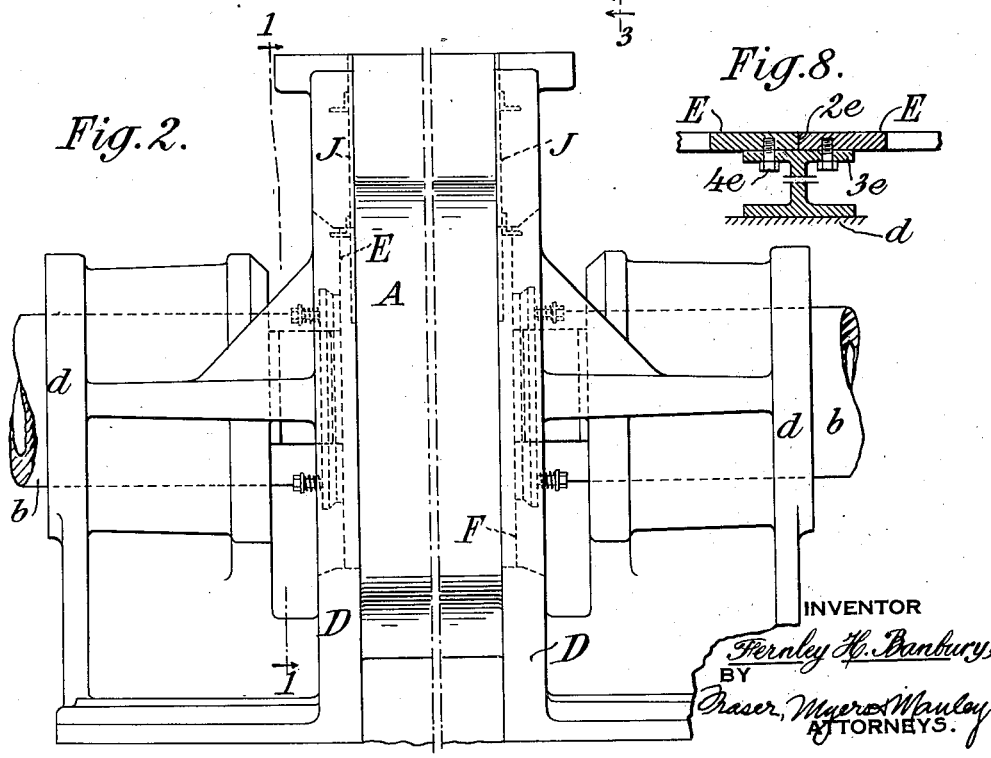
Fig. 2 is a side elevation of the mixer shown in Fig. 1.

Referring to the drawings, let A indicate a side member of a mixer having twin, substantially cylindrical troughs $a$, within which are disposed hollow rotors B having shaft ends $b$ which extend beyond the ends of the side member. At the lower region of union between the twin troughs the side member is formed with an opening within which is fitted a slidable gate or door C in a manner well known to this type of machine. At the upper region of union between the twin troughs, the side member is formed with an opening or neck portion $2a$ within which, in the operation of the machine, a floating weight (not shown) is supported by the mass of material being treated within the mixer. Mounted at each end of the side wall A is an end wall D which is preferably formed integrally with the rotor shaft bearings $d$.

The end walls D are each preferably provided with twin circular openings $2d$ which are of somewhat larger diameter than the troughs $a$ so as to completely encircle and uncover the ends of said troughs when the end walls are mounted in position relative to the side member. Extending outwardly from said circular openings the outer faces of the end walls are often beveled, as shown at $3d$. Fitted within the openings $2d$ and detachably connected to the side member A through the medium of bolts $e$ are rotor end plates or rings E which constitute, according to the present invention, the end walls of the troughs or mixing chamber. These rotor end plates E have central openings through which the rotor shaft ends extend, said openings being of smaller diameter than the ends of the rotors which overlie the inner face of said plates. The plates E at substantially the vertical center line of the machine are formed with abutting flat edges $2e$ and are reinforced along said abutting edges by an I-beam or the like 3e which is secured to the plates E by suitable bolts 4e, and preferably bears against the bearing b.

Figure 5:
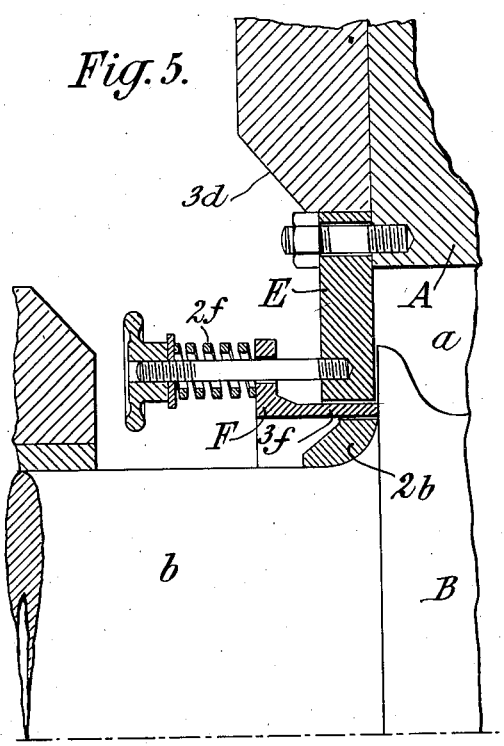

In Figs. 3 and 5 the central openings in the plates E are of substantially greater diameter than the rotor shafts passing therethrough, and the space between said shafts and rings are taken up by filler rings 2b which may be secured to the shaft by bolts 3b, as shown in Fig. 3, or may be force-fitted or shrunk onto said shaft, as shown in Fig. 5. Dust-excluding means are provided between the rings E and the shafts b, and as shown in Fig. 3, these are in the form of a floating ring F which is carried by the ring E, said ring F having an axial flange f, the inner edge of which is held in contact with the ring 2b by a spring 2f, the outer face of said ring having a nice sliding fit with the inner periphery of the ring E. In Fig. 5, the inner edge of the ring 3f is held in contact with the end of the rotor B by the spring 2f.

Figure 6:
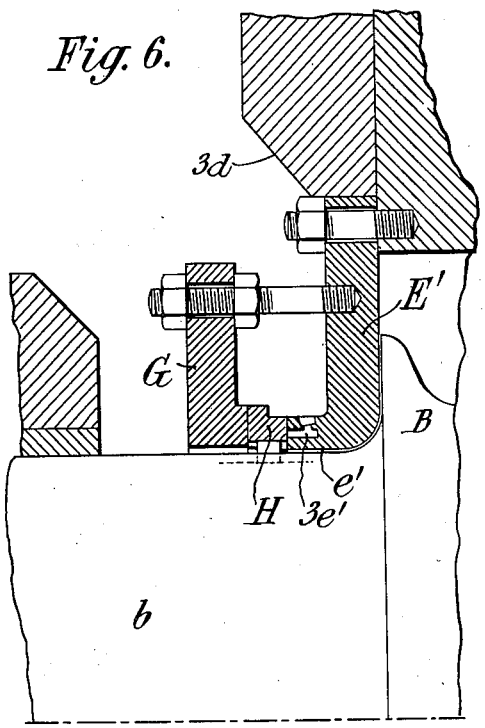
Figs. 5 and 6 are sections similar to Fig. 3 showing additional embodiments of my invention.

In Fig. 6 I have shown the rotor end plate E' as formed at its inner periphery with an axial flange e' disposed in closely spaced relation to the shaft b, and suitable dust-excluding means provided to cooperate with said flange e'. These means comprise a supporting ring G carried by the ring E' and a ring H mounted to rotate with the shaft b and having sliding movement thereon, disposed between the ring G and the end of the axial flange e', the complemental faces of the ring H and the flange e' being in bearing contact. For lubricating the bearing faces of the ring H and the flange e', said flange is provided with lubricating channels 3e'.

Figure 7:
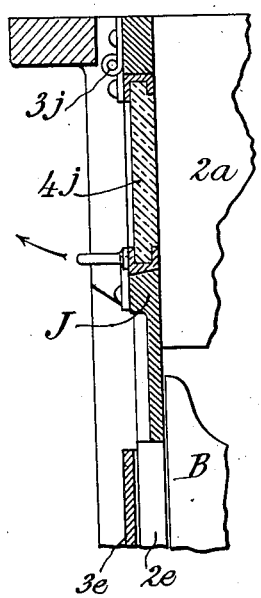
Fig. 7 is a fractional end elevation of a further embodiment of a detachable neck plate.

The end walls D at the neck portion of the machine are cut away or omitted in casting said walls, and separately detachable neck end plates J are provided for closing the neck ends of the machine. As shown in Figs. 1 and 4, these plates J are directly secured to the side member A by bolts j. These plates J at their lower ends are preferably formed with arcuate converging outer walls to seat within the saddle-like opening formed above the abutting portions of the rotor end rings E and thus completely close the end walls of the mixing chamber. These plates J may be reinforced with angle iron members, as shown at 2j, or they may be formed with a hinged door 3j, as shown in Fig. 7. Also if desired, the plates J or the hinged wall 3j thereof may be formed with a plate glass window 4j so that the interior of the mixing chamber can be inspected without removing the plates J or opening the hinged door 3j thereof.

The operation of the machine described is substantially identical with that of the well known Banbury mixer. Should, however, the inner face of any of the rings E become worn or require inspection or attention, instead of completely dismantling one or both of the end walls, to gain access to the mixing chamber end wall which requires attention, the nuts on the bolts e can be removed and any one or more of the rotor end plates or rings can be detached for inspection or removal for the necessary treatment. Should this treatment require the complete removal of a rotor end plate or ring from the machine, this may be accomplished by making the rings E sectional, for example, by having the rings split as shown at 5e in Fig. 1, to provide substantially semi-circular sections. In new machines, however, the rings E may be made as integral units, and when it becomes necessary to remove a ring, it may be cut apart with a torch or hammer and replaced by new ring sections.

Through the use of independently removable plates at the end of the neck portion of the machine it will also be apparent that access can be readily gained to the interior of the neck portion for releasing the floating weight in the event that it becomes stuck therein, and also a more convenient and ready means is thereby provided for inspecting the rotors and the mixing chamber as a whole at close range for mechanical defects. Where a hinged door is provided on the neck end of the machine, complete inspection of the interior thereof is greatly facilitated in going from one important product to another important product. Also by having the neck end plate removable or provided with a hinged door, minor repairs can be made to the rotors without dismantling the machine, as is now necessary. By providing a plate glass window at the lower portion of the neck end wall, in addition to aiding in the inspection of the rotors for defects, the action of the rotors on the material being treated in the machine can be witnessed to advantage.

While I have herein shown several embodiments of my invention, and the manners in which the same may be carried into practical operation, I do not wish to be limited to the specific constructions disclosed, since it will be apparent that the same may be varied within the range of engineering skill without departing from the spirit of my invention.

What I claim is:

1. A mixer or the like having a casing comprising a side member and end walls providing a mixing chamber and a rotor in said chamber extending through the end walls, said end walls having sections encircling the rotor and detachable without first removing said end walls, the said sections engaging the ends of the rotor and bearing the wear due to the rotation of the rotor.

2. A mixer or the like having a casing comprising a side member and end walls secured to said side member and providing therewith a mixing chamber and a rotor in said chamber extending through the end walls, said end walls having sections encircling the rotor and independently detachable from the side member, said sections engaging the ends of the rotor and bearing the wear due to the rotation of the rotor.

3. A mixer or the like having a casing comprising a side member and end walls, said side member having a trough therein which with the end walls provides a mixing chamber, a rotor in said mixing chamber, said end walls having openings through which the rotor shaft extends, said openings being of larger diameter than said rotor, and plates surrounding said rotor shaft, said plates being removable from the mixer without removing said end walls.

4. A mixer or the like having a casing comprising a side member and end walls, said side member having a trough therein which with the end walls, provides a mixing chamber, a rotor in said mixing chamber, said end walls having openings through which the rotor shaft extends, said openings being of larger diameter than the trough and separate independently removable plates closing the opening in the end walls around the rotor shaft.

5. A mixer or the like having a casing comprising a side member and end walls, said side member having twin, substantially cylindrical troughs therein, which with the end walls provide a mixing chamber, a rotor in each trough, said end walls having openings through which the rotor shafts extend, said openings being larger than the cross-sectional area of the twin troughs, and separate plates encircling the rotor shafts closing the openings in the end walls.

6. A mixer or the like having a casing comprising a side member and end walls, said side member having twin, substantially cylindrical troughs therein, which, with the end walls, provide a mixing chamber, a rotor in each trough, said end walls having openings through which the rotor shafts extend, said openings being larger than the cross-sectional area of the twin troughs, separate plates encircling each of the rotor shafts closing the openings in the end walls, said plates common to each end wall having parts in abutting relation and means for bracing said plates at their abutting parts.

7. A mixer or the like having a casing comprising a side member and end walls, said side member having twin, substantially cylindrical troughs therein, which, with the end walls, provide a mixing chamber, a rotor in each trough, said end walls having openings through which the rotor shafts extend, said openings being larger than the cross-sectional area of the twin troughs, separate plates secured to the side member encircling the rotor shafts closing the openings in the end walls, said plates being in abutting relation in proximity to a center line of the mixing chamber and means for reinforcing said plates at said abutting parts.

8. A mixer or the like having a casing comprising a side member and end walls providing a mixing chamber, a rotor in said chamber extending through the end walls, said end walls having sections encircling the rotor and detachable without first removing said end walls, said sections engaging the ends of the rotor and bearing the main longitudinal thrusts thereof, and dust-excluding means between said detachable sections and the rotor.

9. A mixer or the like having a casing comprising a side member and end walls secured to said side member, said side member having twin, substantially cylindrical troughs therein, which, with the end walls, provide a mixing chamber having a neck portion at its top, said end walls having openings therein substantially concentric with, and of larger diameter than the twin troughs, said openings also overlying the ends of the neck portion, a rotor in each trough having a rotor shaft extending through the openings in the end walls, rings encircling said rotor shafts closing the ends of the troughs, said rings at each end wall being in abutting relation in proximity to the center line of the neck portion, a separate neck end wall section fitting in the opening at the end of the neck portion and seating in the saddle-like opening formed above the abutting portions of the rings, and said rings and neck end wall section being removable independently of the end walls.

FERNLEY H. BANBURY.